(12) United States Patent
Wall

(10) Patent No.: US 6,182,995 B1
(45) Date of Patent: Feb. 6, 2001

(54) EXTENDABLE SEMI-TRAILER

(76) Inventor: George B. Wall, R.R. 1, Delhi, IA (US) 52223

( * ) Notice: Under 35 U.S.C. 154(b), the term of this patent shall be extended for 0 days.

(21) Appl. No.: 09/178,782

(22) Filed: Oct. 26, 1998

(51) Int. Cl.[7] .................................................. B60D 1/62
(52) U.S. Cl. ......................... 280/420; 280/656; 212/349; 52/118
(58) Field of Search .................... 280/656, 420, 280/789; 212/349; 52/118, 121

(56) References Cited

U.S. PATENT DOCUMENTS

| | | |
|---|---|---|
| 1,980,015 | 11/1934 | Thompson . |
| 2,150,701 | 3/1939 | Reid . |
| 2,900,198 * | 8/1959 | Patton ............................... 280/656 X |
| 3,165,336 | 1/1965 | Bigge . |
| 3,371,801 * | 3/1968 | Widegren ............................ 52/121 X |
| 3,494,657 | 2/1970 | Tantlinger et al. . |
| 4,103,931 | 8/1978 | Weiss . |
| 4,470,229 * | 9/1984 | Muse et al. ............................. 52/118 |
| 4,544,071 * | 10/1985 | Poock .................................... 212/349 |
| 4,575,976 * | 3/1986 | McDermott et al. ................... 52/118 |
| 4,690,290 * | 9/1987 | Gustafsson .......................... 52/118 X |
| 4,789,120 * | 12/1988 | Spidel ................................. 52/118 X |
| 4,809,472 * | 3/1989 | Hade, Jr. et al. ................. 212/349 X |
| 5,137,297 * | 8/1992 | Walker ................................. 280/656 |
| 5,168,679 * | 12/1992 | Featherstone ...................... 52/121 X |
| 5,244,346 * | 9/1993 | Fergusson .......................... 280/656 X |
| 5,718,345 * | 2/1998 | Hade, Jr. .............................. 212/349 |

FOREIGN PATENT DOCUMENTS

| | | | |
|---|---|---|---|
| 2028826 * | 7/1971 | (DE) | ................................. 212/349 |
| 4210454 * | 10/1993 | (DE) | ................................. 280/789 |
| 2553396 * | 4/1985 | (FR) | ................................. 212/349 |
| 2580237 * | 10/1986 | (FR) | ................................. 280/420 |
| 100645 * | 10/1916 | (GB) | ................................... 52/121 |
| 2209507 * | 5/1989 | (GB) | ................................. 280/420 |
| 2274821 * | 8/1994 | (GB) | ................................. 280/420 |

* cited by examiner

Primary Examiner—Lanna Mai
(74) Attorney, Agent, or Firm—James C. Nemmers

(57) ABSTRACT

The invention provides for the management and protection of excess lengths of utility cables in extendable semi-trailers. Utility cables are affixed to the front and rear sections of an extendable semi-trailer and are threaded through a protective carrier that can bend in only one direction. This directionally restrained carrier rests within a channel that shields the carrier and the cables from wear and tear and which constrains the bending of the carrier to one trans-channel turn. As the trailer is extended, the front and rear sections of the trailer and therefore the ends of the cables and carrier will move relative to one another. The cables and carrier move within the channel from a generally "U"-shaped pattern to a generally "J"-shaped pattern as the trailer moves from the retracted to the extended position.

2 Claims, 2 Drawing Sheets

EXTENDABLE SEMI-TRAILER

BACKGROUND OF THE INVENTION

This invention relates to extendable semi-trailers that can be lengthened or shortened to accommodate loads of varying lengths. More particularly, the invention relates to a mechanism and structure for accommodating the conduits that contain the electrical cables and hydraulic and pneumatic hoses as the length of the trailer is varied.

In order to supply the hydraulic or pneumatic brakes at the rear of the trailer and to provide electrical power for the required lights at the rear, the supply hoses and electrical cables must extend substantially the full length of the trailer. In semi-trailers where the trailer is a fixed length, this is not a problem, but where the length of a flat bed trailer can be varied to accommodate loads of varying lengths, the hoses and cables must be shortened and lengthened without interfering with the load. Typically, the hoses and cables must be detached and reattached, and some accommodation must be made for the extra length of the cables and hoses when the trailer is retracted. Also, these hoses and cables must be protected from damage and excessive wear, especially since failure in a brake line can be a serious safety hazard. In order to accommodate extension of the semi-trailer, the conduits containing the hoses and cables must be of sufficient length to service the rear of the semi-trailer when the trailer is fully extended, and these conduits must be supported, protected, and managed when the trailer is not extended.

The prior art reveals attempts at solving this problem. U.S. Pat. No. 4,103,931 discloses a system in which flexible, extendable cables support extendable, coiled conduits hanging below the bed of the semi-trailer. U.S. Pat. No. 3,165,336 discloses a system utilizing a cable and pulley system attached to springs wherein the extension of the springs and the positioning of the pulleys relative to one another accommodate the extension of the semi-trailer without requiring the use of extendable conduits. Though not directed to the problem inherent in extendable semi-trailers, U.S. Pat. No. 3,494,657 discloses the use of a protective metal channel to house the conduits as they extend along the length of the trailer from front to rear. However, none of these prior art solutions provide a simple, inexpensive way of completely managing and protecting the conduit and the hoses and cables it contains regardless of the length of the trailer. There is therefore a need for an improved means for supporting, guiding and protecting the conduit when the trailer is fully or partially extended or fully retracted.

SUMMARY OF THE INVENTION

The present invention provides a novel means for supporting, controlling, and protecting the trailer hoses and cables regardless of whether the trailer is in the extended or non-extended position. This is accomplished without the use of springs, pulleys, or extendable, coiled conduits. Support, control, and protection are achieved by enclosing the hoses and cables within a link-type carrier designed to constrain movement of the carrier to one direction only. The carrier is positioned within a channel such that the carrier can bend only in a direction allowing it to fold back upon itself within the channel. Thus, the directionally constrained carrier may only rotate in one direction, and rotation in that direction is limited to a single turn of a diameter that will fit within the channel. Protection, management, and control of the wire cables and fluid hoses are therefore provided without the use of pulleys or elastic or coiled conduits; the carrier doublebacks upon itself when the trailer is in the retracted position. Because the direction of motion is constrained, the carrier and the cables and hoses contained within it are unable to turn or twist in a fashion that would hinder the extension or retraction of the trailer or damage the cable or hoses contained within the carrier.

DESCRIPTION OF THE PREFERRED EMBODIMENT OF THE INVENTION

Figure 1:
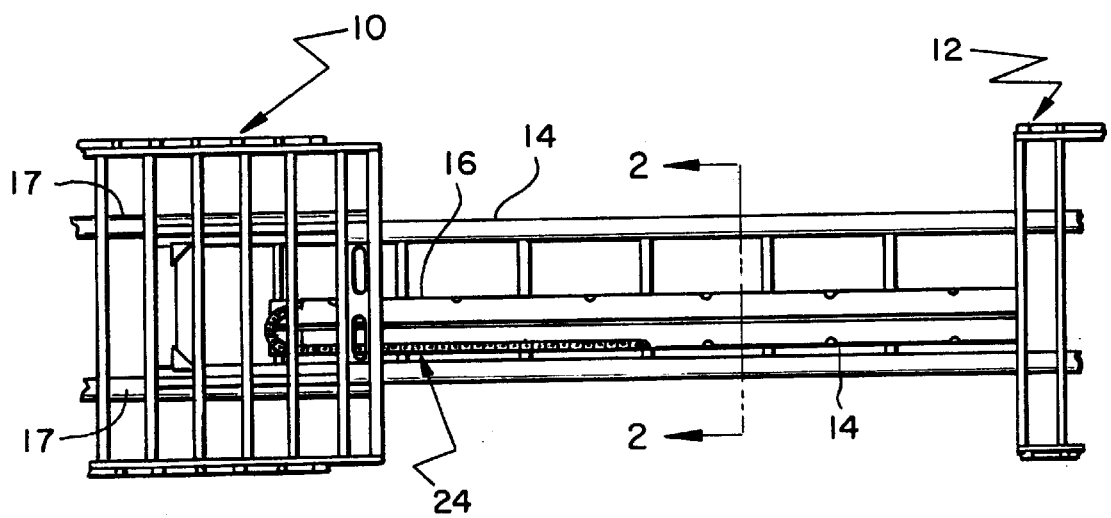
FIG. 1 is a plan view of a portion of an extendable trailer in the extended position and showing the directionally constrained carrier in the extended position.
Figure 2:
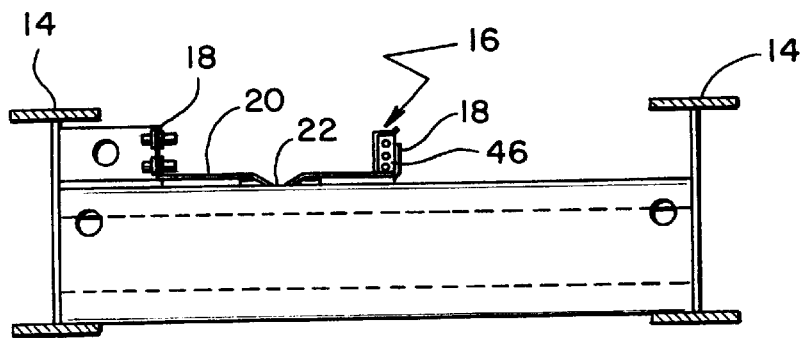
FIG. 2 is a cross sectional view taken on the line 2—2 of FIG. 1 and showing the housing channel and the rear utility terminal and a cross section of the directionally constrained carrier.
Figure 3:
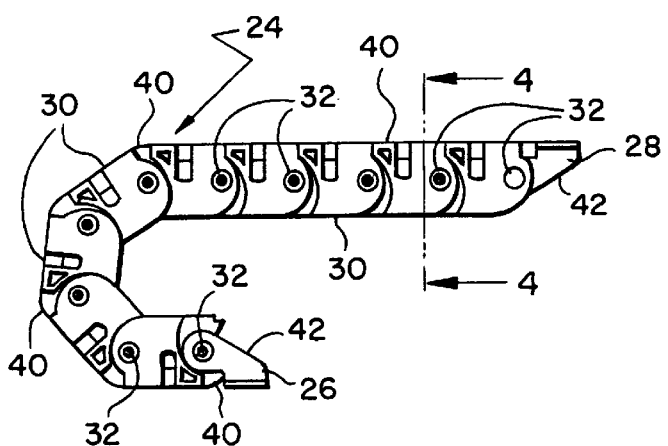
FIG. 3 is a plan view of a length of the directionally constrained carrier.

Referring to the drawings, and particularly FIG. 1, there is shown a portion of an extendable semi-trailer having a front section 10, a rear section 12, and longitudinally extending support beams 14. The support beams 14 comprise an integral part of and are rigidly affixed to the rear section 12. The support beams 14 extend from the rear section 12 to the front section 10 where the beams 14 nest within front section 10 by slideably engaging longitudinal guide beams 17 that form a part of the front section 10. The front section 10 and the rear section 12 therefore are moveable relative to one another by allowing the support beams 14 to move telescopically within the front section 10, being guided by beams 17.

As is well know to those skilled in the art, the front section 10 of the trailer is connectable to a prime mover or tractor (not shown) to form the semi-trailer, with the rear section 12 being suitably mounted on ground wheels (not shown).

The support beams 14 support on their upper surfaces a channel 16 which is comprised of two spaced-apart vertical walls 18 connected at their lower ends to a bottom wall 20. Since the trailer is exposed to the elements, the bottom wall 20 contains a longitudinally extending slot 22 extending along substantially the entire length of the channel 16 so as to allow foreign material, such as debris, condensation, precipitation, etc. to escape from the channel 16.

Figure 4:
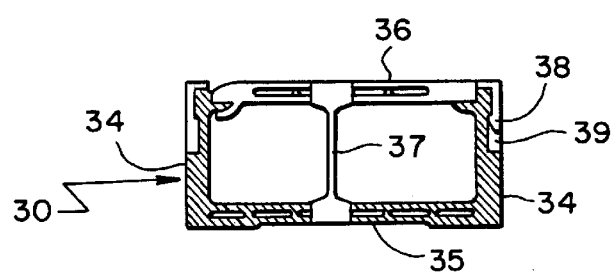
FIG. 4 is a sectional view of one of the links of the carrier of FIG. 3, the view being taken on the line 4—4 of FIG. 3.

A directionally constrained carrier, indicated generally by the reference numeral 24, is seated within the channel 16. The carrier 24 has a front terminal link 26, a rear terminal link 28 and a plurality of intermediate links 30. The front terminal link 26, the rear terminal link 28 and the intermediate links 30 are connected together for limited pivotal movement by pins 32. As best seen in FIG. 4, each of the intermediate links 30 has parallel, laterally spaced-apart side walls 34 joined together on their inner edges by cross member 35 and on the outer edges by longitudinally spaced-apart hinge bars 36. If desired, an intermediate support 37 can be positioned between the side walls 34. Each hinge bar 36 is hinged at one end to side wall 34 and has a locking tab 38 at the opposite end that snaps into a corresponding groove 39 in the opposite side wall 34. Each side wall 34 of each intermediate link 30 also contains a longitudinally extending shoulder that provides a stop 40. Rotation of links 30 relative to each other about the pivot pins 32 is thus constrained to one direction due to the stops 40. The intermediate links 30 also nest against each other and are free to pivot through a limited arc in one direction only. The front terminal link 26 and the rear terminal link 28 are connected to the intermediate links 30 by pivot pins 32, and each of the links 26 and 28 have tapered side walls 42. Carriers 24 of the type described above in the preferred embodiment of the invention are commercially available from Gortrac, a division of ASA Mfg. Co. Inc. of New Berlin, Wis. under the brand name of Nylatrac®.

Figure 5:
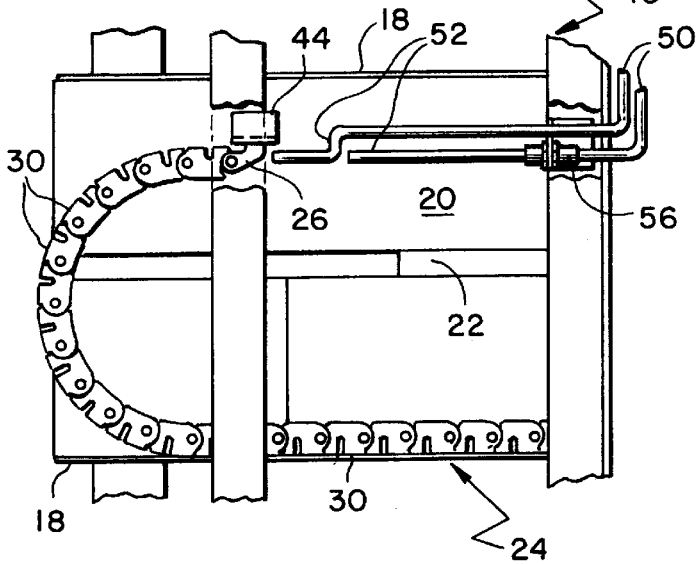
FIG. 5 is an enlarged plan view of a portion of the rear end of the extendable trailer and showing the rear terminal ends of the utility cabes and the directionally restrained carrier.

As best seen in FIG. 5, a front carrier bracket 44 is affixed to the front section 10 and extends downwardly within the channel 16. The front terminal link 26 of the carrier 24 is attached in any suitable manner to the front carrier bracket 44. A rear carrier bracket 46 is affixed to a vertical wall 18 of the channel 16. The rear terminal link 28 of the carrier 24 is affixed to the rear carrier bracket 46.

Through the foregoing described connections of the carrier 24 between the rear carrier bracket 46 and the front carrier bracket 44, the terminal ends of the carrier 24 are thus fixed between the front section 10 and the relatively moveable rear section 12. The carrier 24 extends forwardly from the front carrier bracket 44 and then turns 180° along the bottom wall 20 of the channel 16 toward the rear section 12. With the carrier 24 confined between the vertical walls 18 of the channel 16, the carrier 24 will move from a generally "U"-shaped pattern to a generally "J"-shaped pattern as the trailer moves from a non-extended position to an extended position. There is therefore at all times one generally semi-circular loop in the directionally constrained carrier 24, and the length of carrier 24 on either side of the loop varies depending on the degree of trailer extension.

Figure 6:
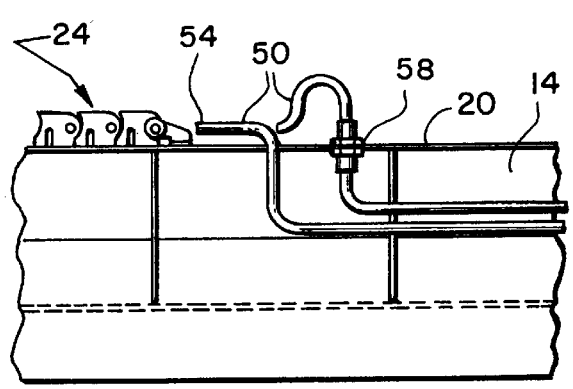
FIG. 6 is a side elevational view of a portion of the front end of the extendable trailer and showing the front terminal ends of the utility cables and the directionally restrained carrier.

Referring now to FIGS. 5 and 6, there are shown utility cables 50 of the general type required to deliver power and compressed air or hydraulic fluid to a semi-trailer from the tractor. These cables 50 include but are not limited to hydraulic or pneumatic hoses and electrical cables, and the cables 50 are nested within the directionally constrained carrier 24, being retained inside the carrier 24 by the cross members 35 and the hinge bars 36. The utility cables 50 have front ends 52 and rear ends 54 with the front ends 52 being affixed to the extendable semi-trailer front section 10 at the front utility mounting bracket 56 located generally near the front carrier bracket 44. The utility cable rear ends 54 are affixed to the extendable semi-trailer central support beams 14 at a rear utility mounting bracket 58 located generally near the rear carrier bracket 46.

The invention thus protects the cables 50 and accommodates semi-trailer extension and retraction by encasing the cables 50 within the carrier 24 which has interlocking links designed so that the carrier 24 can bend in only one direction only. The cables 24 thus encased within the carrier 24 are confined within the channel 16. The channel 16 is sufficiently wide to accommodate the diameter of a semi-circular loop created by the flexible carrier 24 as it turns back upon itself within the channel 16. Thus, as the channel 16 and the rear section 12 move relative to the front section 10 of the trailer to extend or shorten the length of the trailer, the carrier 24 confines, protects and guides the cables 50.

The invention is an improvement in safety and ease of use. Drivers are able to extend or retract the trailer without manipulating the cables and without the aid of spring and pulley or other complex and difficult to maintain systems. The system of the invention does not depend upon elastic components, and the design of the protective carrier 24 does not allow the extra cable to "sag", twist or tangle. Importantly, the positioning of the cables inside the carrier and inside the channel protects the cables from roadway debris that may damage electrical or hydraulic lines. In comparison, the prior art systems either allow the conduits to coil and hang exposed to the roadway or hold the cables under tension as part of a pulley and spring system.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is as follows:

1. A utility cable management system for an extendable semi-trailer having a front section, a rear section and support beams extending between the front section and rear section, the front section and rear section being moveable relative to each other, said utility cable management system comprising: a channel having a bottom wall extending in a generally horizontal plane, spaced apart side walls and a rear end and a front end, the channel being adapted for connection with the support beams; a rear connector combined with the channel and a front connector adapted to be combined with the front section; a utility cable carrier having a front end connected to the front connector and a rear end connected to the rear connector; the utility cable carrier being supported on the bottom wall of the channel between the channel side walls; the utility cable carrier having a longitudinal axis and extending forwardly from the front connector and then turning back upon itself in a generally semi-circular turn and in a generally horizontal plane so as to extend to the rear connector; the utility cable carrier including a plurality of interlocked links joined together to form the carrier, the links each being hollow and adapted to receive one or more utility cables inside the links along the longitudinal axis, and pivot pins extending generally vertically to interconnect the links, each of said links containing a directional constraint means for limiting the movement of each link to one direction of rotation about said pivot pins.

2. The utility cable management system of claim 1 in which the movement of each link about a pivot pin is limited to less than three hundred and sixty degrees, and the directional constraint means includes a stop extending from one link toward an adjacent link to engage the adjacent link and limit relative movement of the links.

* * * * *